United States Patent
Toya et al.

(10) Patent No.: US 6,943,525 B2
(45) Date of Patent: Sep. 13, 2005

(54) POWER SOURCE APPARATUS FOR AN ELECTRIC AUTOMOBILE

(75) Inventors: Shoichi Toya, Kasai (JP); Kuniho Tanaka, Kasai (JP); Toru Mizuta, Kakogawa (JP); Hiroshi Tatsumi, Kakogawa (JP); Masato Takami, Kasai (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/372,253

(22) Filed: Feb. 25, 2003

(65) Prior Publication Data

US 2003/0173932 A1 Sep. 18, 2003

(30) Foreign Application Priority Data

Feb. 26, 2002 (JP) .......................................... 2002/050338

(51) Int. Cl.[7] .............................. H02J 7/00; H02J 7/16
(52) U.S. Cl. ....................................... 320/104; 320/150
(58) Field of Search ................................ 320/104, 106, 320/125, 103, 150; 307/10.1; 180/65.3; 701/22; 318/139

(56) References Cited

U.S. PATENT DOCUMENTS 5,819,187 A * 10/1998 Sato et al. ..................... 701/1
6,025,695 A * 2/2000 Friel et al. ................... 320/106
6,204,636 B1 * 3/2001 Kinoshita et al. ............ 320/134
6,392,380 B2 * 5/2002 Furukawa et al. ........... 320/104
6,465,988 B2 * 10/2002 Ito et al. ...................... 320/131
6,657,415 B2 * 12/2003 Saeki et al. .................. 320/125
6,700,383 B2 * 3/2004 Kimura et al. ............... 324/429

* cited by examiner

*Primary Examiner*—Pia Tibbits
(74) *Attorney, Agent, or Firm*—Wenderoth, Lind & Ponack, L.L.P.

(57) ABSTRACT

A power source apparatus for an electric automobile is provided with a battery system, having a driving battery to power an automobile driving motor and a battery control circuit to control driving battery charging and discharging as well as to compute driving battery remaining capacity, and an accessory battery to power automobile electrical accessories. When the automobile is in the stationary state a, charging circuit, which controls charging between the driving battery and accessory battery, charges the driving battery to a specified state with accessory battery power. The battery control circuit corrects the value of driving battery remaining capacity to a specified battery capacity, and subsequently charges the accessory battery with the driving battery to bring driving battery remaining capacity to a specified level.

15 Claims, 1 Drawing Sheet

POWER SOURCE APPARATUS FOR AN ELECTRIC AUTOMOBILE

This application is based on Application No. 50338 filed in Japan on Feb. 26, 2002, the content of which is incorporated herein by reference.

BACKGROUND OF THE INVENTION

The present invention concerns a power source apparatus for an electric powered automobile.

One type of electric automobile, the hybrid car, operates by driving the wheels via an engine, and an electric motor. As a power source to run the motor of such an automobile, a driving battery configured with battery modules of many series-connected rechargeable batt eries (nickel cadmium batteries, nickel hydrogen batteries, lithium ion rechargeable batteries, etc.) is carried on board. This driving battery is charged using a generator powered either by the engine or by regenerative braking which utilizes the automobiles inertia during stopping.

Long lifetime, high reliability, and safe operation are required of the driving battery. Consequently, charge capacity and discharge capacity are normally regulated to prevent over-charging or over-discharging of each rechargeable battery of the driving battery and to keep remaining capacity of the driving battery within a set range (for example, 40% to 60% of full charge).

For this type of driving battery, charging and discharging must be controlled to maintain driving battery remaining capacity within the set range. Consequently, driving battery remaining capacity must be accurately computed.

Further, the driving battery is configured with many rechargeable batteries connected in series. Therefore, if battery capacity differentials develop between individual rechargeable batteries, there is risk of detrimental effects from over-charging or over-discharging a battery or batteries in one section.

In general, a driving battery comprising rechargeable batteries will have memory effect and self-discharge, as well as output decrease in low temperature conditions.

The present invention was developed to effectively resolve these shortcomings. It is thus the first object of the present invention to accurately compute driving battery remaining capacity.

The second object of the present invention is to effectively eliminate driving battery component battery capacity differentials.

Further objects of the present invention are to suppress driving battery memory effect and self discharge in an optimum fashion, and to prevent output decrease in cold temperature conditions.

The above and further objects and features of the invention will more fully be apparent from the following detailed description with accompanying drawings.

SUMMARY OF THE INVENTION

The power source apparatus for an electric automobile of the present invention is provided with a battery system, equipped with a driving battery to power an automobile driving motor and a battery control circuit to control charging and discharging of that driving battery as well as to compute driving battery remaining capacity, and an accessory battery to power automobile electrical accessories.

The first invention is provided with a charging circuit to control charging between the driving battery and the accessory battery. The charging circuit is characterized by charging the driving battery to a specified level of charge with power from the accessory battery while the automobile is stopped, as well as by revising the value of remaining capacity of the driving battery to a specified capacity. Subsequently, the accessory battery is charged by the driving battery to establish prescribed remaining capacity in the driving battery.

The second invention is also provided with a charging circuit to control charging between the driving battery and the accessory battery. The charging circuit is characterized by charging the driving battery at a low charging rate with power from the accessory battery while the automobile is stopped. The low rate charging is to reduce driving battery component remaining capacity differentials. Subsequently, the accessory battery is charged by the driving battery to establish prescribed remaining capacity in the driving battery.

The third invention is also provided with a charging circuit to control charging between the driving battery and the accessory battery. The charging circuit is characterized by discharging driving battery power to the accessory battery while the automobile is stopped. The discharge is to eliminate memory effect in the driving battery. Subsequently, the driving battery is charged by the accessory battery to establish prescribed remaining capacity in the driving battery.

The fourth invention is also provided with a charging circuit to control charging between the driving battery and the accessory battery. The charging circuit is characterized by charging the driving battery with the accessory battery while the automobile is stopped if driving battery remaining capacity is at or below a specified level.

The fifth invention is provided with a charging circuit to control charging between the driving battery and the accessory battery and a temperature sensing circuit to detect driving battery temperature. It is characterized by the charging circuit charging the driving battery with the accessory battery when driving battery temperature is below a specified value.

The power source apparatus described above can produce an accurate value of driving battery remaining capacity at any time, and can effectively eliminate driving battery component capacity differentials.

Further, driving battery memory effect and self discharge can be suppressed in an optimum fashion, and output decrease in cold temperature conditions can be prevented.

Since these operations are performed automatically while the automobile is stopped, they can be performed with precision.

Finally, even in the case when the driving battery is being compensated or a deleterious effect on the driving battery is being suppressed, the driving battery is put in a specified state. Therefore, there is no detrimental effect on the operation of driving the automobile.

DETAILED DESCRIPTION OF THE INVENTION

Figure 1:
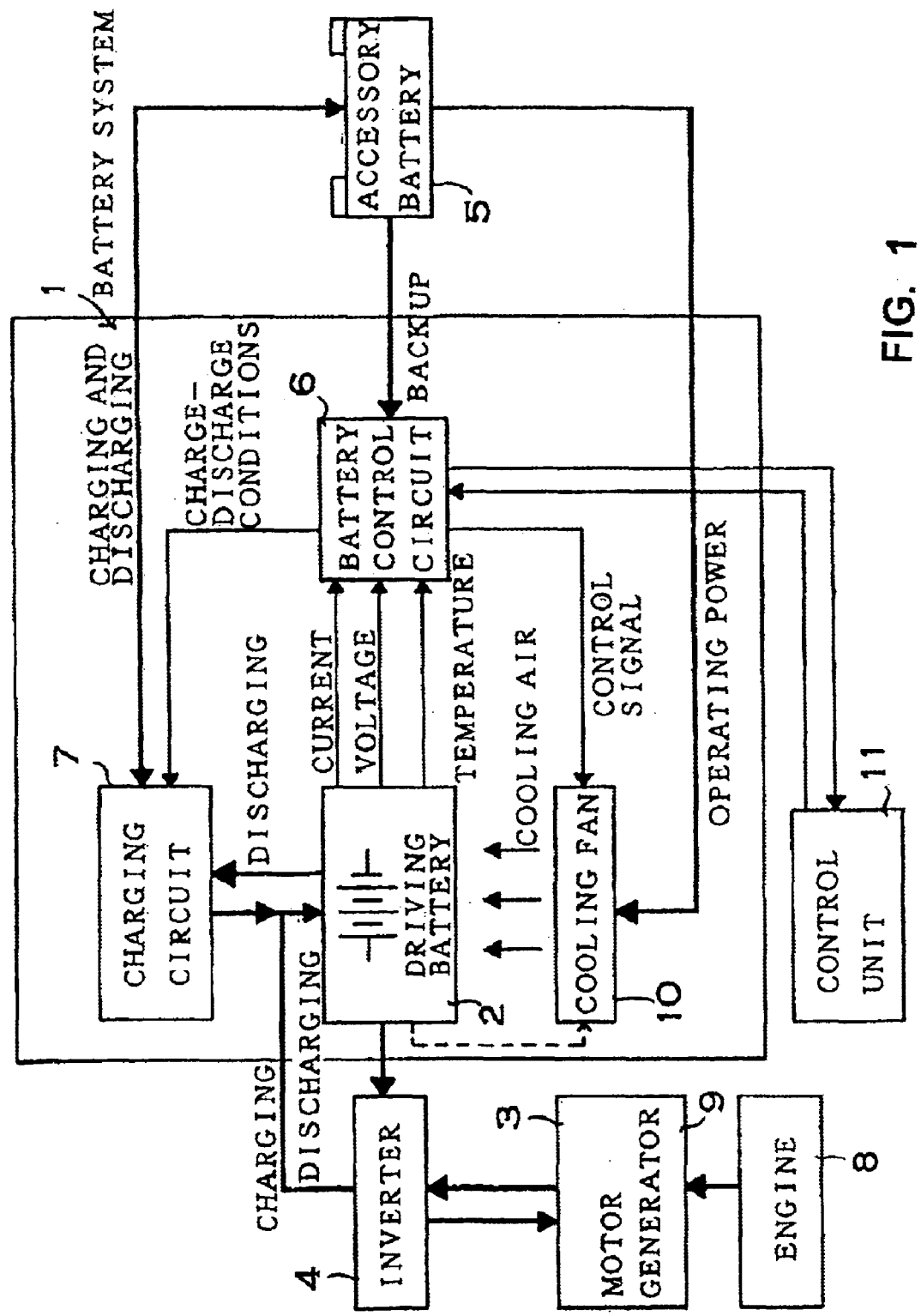
FIG. 1 is a block diagram showing an electric automobile power source apparatus related to an embodiment of the present invention.

The following describes an embodiment of the present invention based on the FIGURE.

The power source apparatus for an electric automobile shown in FIG. 1 is provided with a battery system 1 equipped with a driving battery 2 to power an automobile driving motor 3, an inverter 4 to supply output from the driving battery 2 contained in the battery system 1 to the motor 3, and an accessory battery 5 to run automobile electrical accessories.

The battery system 1 is provided with a driving battery 2, a battery control circuit 6 to charge and discharge the driving battery 2 while preventing over-charging and over-discharging and to compute driving battery 2 remaining capacity, a charging circuit 7 to control charging between the driving battery 2 and the accessory battery 5, and a cooling fan 10 for the driving battery 2.

The driving battery 2 has many rechargeable batteries connected in series and modularized. The rechargeable batteries are batteries such as nickel cadmium batteries, nickel hydrogen batteries, and lithium ion rechargeable batteries.

The battery control circuit 6 detects driving battery 2 voltage, current flowing in the driving battery 2, and driving battery 2 temperature. The voltage of each of the plurality of series connected rechargeable batteries of the driving battery 2 can be measured, or the voltage of each battery module having a plurality of series-connected rechargeable batteries can be measured. Measurement of current flowing in the driving battery 2 is performed by measuring the voltage developed across current sensing resistors (not illustrated) connected in series with the batteries. The distinction between charging current and discharging current is made by noting the polarity of the voltage developed across the current sensing resistors. Driving battery 2 temperature is detected by temperature sensors. Temperature sensors are disposed in close proximity to each battery, or in close proximity to each battery module.

The battery control circuit 6 computes driving battery 2 remaining capacity based on charging current and discharging current. Remaining battery capacity computation is performed for each battery module that makes up the driving battery 2. Charge capacity is computed using the integrated value of charging current and charging efficiency. Discharge capacity is computed from the integrated value of discharging current. In addition, discharge capacity is computed considering self-discharge of the driving battery 2. The battery control circuit 6 is controlled by the automobile control unit 11 to in turn control charging and discharging of the driving battery 2 and keep driving battery 2 remaining capacity within a prescribed range (for example, 40% to 60%) during normal operation.

The battery control circuit 6 also stores a table, previously loaded into memory, which indicates the relation of driving battery 2 voltage and remaining capacity. This table allows driving battery 2 remaining capacity computed by the battery control circuit 6 to be corrected. For example, if the driving battery 2 voltage attains a peak value during charging, the battery control circuit 6 sets driving battery 2 remaining capacity to 90%.

Further, the battery control circuit 6 controls the charging circuit 7 to charge the driving battery 2 with the accessory battery 5 or to charge the accessory battery 5 with the driving battery 2. When driving battery 2 remaining capacity drops below a set value and the driving battery 2 cannot turn over the motor 3 to start the engine 8, or when driving battery 2 remaining capacity is corrected in accordance with this invention, or when various control functions are performed, the battery control circuit 6 charges the driving battery 2 with the accessory battery 5 via the charging circuit 7 or conversely charges the accessory battery 5 with the driving battery 2.

The charging circuit 7 converts voltage to allow charging between the accessory battery 5 and the driving battery 2. Since the driving battery 2 has higher voltage than the accessory battery 5, accessory battery 5 voltage is stepped up when charging the driving battery 2 with the accessory battery 5. Driving battery 2 voltage is stepped down when charging the accessory battery 5 with the driving battery 2.

The cooling fan 10 delivers cooling air to cool the driving battery 2 when driving battery 2 temperature becomes abnormally high. Consequently, operation of the cooling fan 10 is controlled by the battery control circuit 6. Power is supplied to the cooling fan 10 from the accessory battery 5, but it may also be operated by the driving battery 2.

The inverter 4 converts direct current (DC) of the driving battery 2 to three-phase alternating current (AC) to drive the motor 3 via the driving battery 2. In addition, the inverter 4 converts output from the generator 9 to DC at the driving battery 2 charging voltage to charge the driving battery 2 via generator 9 output. Consequently, the inverter 4 is connected between the driving battery 2 and the motor 3, and is also connected between the generator 9 and the driving battery 2.

The accessory battery 5 is a 12V lead storage battery, but it is not restricted to that type of battery. A 24V battery or rechargeable battery other than lead storage may also be used as the accessory battery 5.

To accurately compute driving battery 2 remaining capacity in the present invention, remaining battery capacity is appropriately revised, capacity differentials between rechargeable batteries which make up the driving battery 2 are effectively eliminated, driving battery 2 memory effect and self discharge are suppressed in an optimum fashion, and output decrease in cold temperature conditions is prevented. All of these operations are performed when the automobile is stopped, namely when the ignition key is in the off position.

First, revision of driving battery 2 remaining capacity is described in the following.

This revision operation is performed at regular intervals or when the difference between the computed value of driving battery 2 remaining capacity and the actual battery capacity becomes large. As explained previously, while the automobile is being driven, the battery control circuit 6 controls charging and discharging to maintain driving battery 2 remaining capacity within a specified range (for example, 40% to 60%). However, when battery capacity revision is being performed, the battery control circuit 6 controls charging and discharging with an upper limit of 70% to 80% on driving battery 2 remaining capacity.

When the automobile is stopped (namely, when the ignition key is turned off), i.e., placed in the stationary state, the battery control circuit 6 controls the charging circuit 7 to charge the driving battery 2 with the accessory battery 5. This charging is performed at constant power (for example, 2 kW).

When driving battery 2 voltage reaches a peak value (i.e., specified peak voltage level) under constant power charging, the battery control circuit 6 corrects driving battery 2 remaining capacity to a first specified capacity level of 90%. As a result, driving battery 2 remaining capacity is revised to a correct value.

Subsequently, the battery control circuit 6 controls the charging circuit 7 to charge the accessory battery 5 with the driving battery 2 (in other words to discharge the driving battery 2) and bring the value of driving battery 2 remaining capacity to a second specified capacity level (i.e., within a specified range of 40% to 60%).

In this manner, operations to revise remaining battery capacity are performed while the automobile is stopped with the ignition key off. Therefore, the state of the driving battery 2 can be accurately measured, and remaining battery capacity can be computed more precisely.

Next, operations to effectively eliminate capacity differentials between rechargeable batteries that make up the driving battery 2 are described in the following.

Operations to eliminate battery capacity differentials are performed at regular intervals or when capacity differentials between rechargeable batteries (or battery modules) that make up the driving battery 2 become large. For the case of eliminating battery capacity differentials, the battery control circuit 6 also controls charging and discharging with an upper limit of 70% to 80% on driving battery 2 remaining capacity.

When the automobile is stopped (namely, when the ignition key is turned off), the battery control circuit 6 controls the charging circuit 7 to charge the driving battery 2 with the accessory battery 5. This charging of the driving battery 2 is low-rate constant current charging (for example, 0.1 C to 0.5 C).

During this type of charging, when driving battery 2 voltage reaches a peak value, or driving battery 2 voltage reaches a specified value, or when a specified time has elapsed, the battery control circuit 6 terminates driving battery 2 charging. Consequently, driving battery 2 component battery capacity differentials are eliminated.

Subsequently, the battery control circuit 6 controls the charging circuit 7 to charge the accessory battery 5 with the driving battery 2 (in other words to discharge the driving battery 2) and bring the value of driving battery 2 remaining capacity within the specified range (40% to 60%).

Next, operations to suppress driving battery 2 memory effect are described in the following.

Operations to suppress driving battery 2 memory effect are performed at regular intervals or when it is determined that rechargeable batteries which make up the driving battery 2 have developed memory effect. In this case, the battery control circuit 6 controls charging and discharging with a lower limit of 20% to 30% on driving battery 2 remaining capacity.

When the automobile is stopped (namely, when the ignition key is turned off), the battery control circuit 6 controls the charging circuit 7 to charge the accessory battery 5 with the driving battery 2, in other words to discharge the driving battery 2.

During this discharge, when driving battery 2 remaining capacity reaches 10% to 15%, the battery control circuit 6 terminates driving battery 2 discharge. This action effectively suppresses driving battery 2 memory effect.

Subsequently, the battery control circuit 6 controls the charging circuit 7 to charge the driving battery 2 with the accessory battery 5 and bring driving battery 2 remaining capacity to a specified capacity level (i.e., within a specified range of 40% to 60%).

In addition, when the automobile is stopped, the battery control circuit 6 monitors driving battery 2 voltage and remaining capacity. When driving battery 2 voltage drops below a specified voltage, or when driving battery 2 self discharge capacity becomes greater than a specified value, the charging circuit 7 is controlled to charge the driving battery 2 with the accessory battery 5 and bring the value of driving battery 2 remaining capacity within the specified range (40% to 60%).

Further, when the automobile is stopped, the battery control circuit 6 monitors driving battery 2 temperature. When driving battery 2 temperature is below a specified temperature, the charging circuit 7 is controlled to charge the driving battery 2 with the accessory battery 5 and cause driving battery 2 temperature to rise. As a result, driving battery 2 discharge characteristics are improved, and discharge can be performed at a specified output level.

When driving battery 2 temperature rises to a specified temperature, the battery control circuit 6 controls the charging circuit 7 to charge the accessory battery 5 with the driving battery 2 (in other words to discharge the driving battery 2) and bring the value of driving battery 2 remaining capacity within the specified range (40% to 60%).

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims or equivalence of such meets and bounds thereof are therefore intended to be embraced by the claims.

What is claimed is:

1. A power source apparatus for powering an electric automobile, comprising:
   a battery system including a driving battery for powering a driving motor of the electric automobile, and a battery control circuit for controlling charging and discharging of said driving battery and for computing a remaining capacity value of said driving battery;
   an inverter for supplying an output of said driving battery to the automobile driving motor;
   an accessory battery for powering automobile electrical accessories; and
   a temperature sensing circuit for detecting a temperature of said driving battery;
   wherein said battery system further includes a charging circuit operable to control charging between said driving battery and said accessory battery such that when the detected temperature of said driving battery falls below a specified temperature, said charging circuit controls charging so as to charge said driving battery with said accessory battery.

2. The power source apparatus of claim 1, wherein said charging circuit is further operable to charge said accessory battery with said driving battery when the detected temperature of said driving battery rises to the specified temperature.

3. The power source apparatus of claim 2, wherein said charging circuit is further operable to charge said accessory battery with said driving battery when the detected temperature of said driving battery rises to the specified temperature, until the remaining capacity value of said driving battery is within a specified range.

4. The power source apparatus of claim 2, wherein said charging circuit is further operable to charge said accessory battery with said driving battery when the detected temperature of said driving battery rises to the specified temperature, until the remaining capacity value of said driving battery is within a range of 40% to 60%.

5. A power source apparatus for powering an electric automobile, comprising:
   a battery system including a driving battery for powering a driving motor of the electric automobile, and a battery control circuit for controlling charging and discharging of said driving battery and for computing a remaining capacity value of said driving battery; and an accessory battery for powering automobile electrical accessories;

wherein said battery system further includes a charging circuit operable to control charging between said driving battery and said accessory battery such that, when the electric automobile is in a stationary state, said charging circuit charges said driving battery to a specified peak voltage level with said accessory battery, corrects the remaining capacity value of said driving battery to a first specified driving battery capacity level, and subsequently charges said accessory battery with said driving battery to bring the remaining capacity value of said driving battery to a second specified driving battery capacity level.

6. The power source apparatus of claim 5, wherein when the electric automobile is in the stationary state, said charging circuit is operable to charge said driving battery at a low rate with said accessory battery to reduce remaining battery capacity differences within said driving battery, and is operable to subsequently charge said accessory battery with said driving battery to bring the remaining capacity value of said driving battery to the second specified driving battery capacity level.

7. The power source apparatus of claim 6, wherein when the electric automobile is in the stationary state, said charging circuit is operable to charge said driving battery at a low rate with a charging current in a range of 0.1 C to 0.5 C with said accessory battery to reduce remaining battery capacity differences within said driving battery.

8. The power source apparatus of claim 5, wherein when the electric automobile is in the stationary state, said charging circuit is operable to charge said driving battery with said accessory battery when the remaining capacity value of said driving battery falls below the second specified driving battery capacity level.

9. The power source apparatus of claim 5, wherein when the electric automobile is in the stationary state, said charging circuit is operable to discharge said driving battery to said accessory battery to suppress driving battery memory effect, and is operable to subsequently charge said driving battery with said accessory battery to bring the remaining capacity value of said driving battery to the second specified driving battery capacity level.

10. The power source apparatus of claim 5, wherein said battery control circuit is operable to detect a temperature of said driving battery, and said charging circuit is operable to charge said driving battery with said accessory battery when the detected temperature of said driving battery is lower than a specified temperature.

11. The power source apparatus of claim 5, wherein said battery control circuit has a table indicating the relationship between a voltage of said driving battery and a stored remaining capacity value of said driving battery previously stored in a memory, and said charging circuit is operable to correct the remaining capacity value of said driving battery based on the relationship indicated by said table.

12. The power source apparatus of claim 5, wherein said charging circuit is operable to charge said driving battery with said accessory battery when said driving battery is unable to turn over the motor to start the electric automobile.

13. The power source apparatus of claim 5, wherein said charging circuit is operable to convert voltage levels to allow charging between said driving battery and said accessory battery.

14. The power source apparatus of claim 13, wherein said charging circuit is operable to step up a voltage of said accessory battery to charge said driving battery with said accessory battery.

15. The power source apparatus of claim 13, wherein said charging circuit is operable to step down a voltage of said driving battery to charge said accessory battery with said battery.

* * * * *